United States Patent
Hsiao et al.

(10) Patent No.: US 7,685,314 B2
(45) Date of Patent: Mar. 23, 2010

(54) SYSTEM INTEGRATION SYSTEM AND METHOD

(75) Inventors: Chiun-Feng Hsiao, Belmont, CA (US); Ming-Tao Liou, Fremont, CA (US); Martin Joseph Finnerty, Moraga, CA (US); Shan Wei, Palo Alto, CA (US)

(73) Assignee: Siebel Systems, Inc., San Mateo, CA (US)

( * ) Notice: Subject to any disclaimer, the term of this patent is extended or adjusted under 35 U.S.C. 154(b) by 859 days.

(21) Appl. No.: 10/183,020

(22) Filed: Jun. 27, 2002

(65) Prior Publication Data
US 2007/0214459 A1 Sep. 13, 2007

(51) Int. Cl.
*G06F 15/16* (2006.01)
(52) U.S. Cl. .................. 709/246; 715/235; 715/236; 717/111; 717/113
(58) Field of Classification Search ............. 709/202, 709/206, 246; 715/235, 236; 717/111, 113
See application file for complete search history.

(56) References Cited

U.S. PATENT DOCUMENTS

| | | | |
|---|---|---|---|
| 6,141,681 A * | 10/2000 | Kyle ........................ 709/206 |
| 6,772,216 B1 * | 8/2004 | Ankireddipally et al. .... 709/230 |
| 6,928,487 B2 * | 8/2005 | Eggebraaten et al. ....... 709/246 |
| 7,051,015 B1 * | 5/2006 | Street et al. ..................... 707/3 |
| 7,085,841 B2 * | 8/2006 | Edwards et al. ............ 709/230 |
| 7,127,641 B1 * | 10/2006 | Anderson ..................... 714/38 |
| 7,131,138 B2 * | 10/2006 | Ikeda ............................ 726/3 |
| 7,152,205 B2 * | 12/2006 | Day et al. ................... 715/239 |
| 7,162,542 B2 * | 1/2007 | Abjanic et al. ............. 709/246 |
| 7,260,776 B2 * | 8/2007 | Moreau et al. ............. 715/513 |
| 7,581,170 B2 * | 8/2009 | Baumgartner et al. ....... 715/234 |
| 2002/0169789 A1 * | 11/2002 | Kutay et al. .............. 707/104.1 |
| 2002/0199025 A1 * | 12/2002 | Kutay et al. ................ 709/250 |
| 2003/0028589 A1 * | 2/2003 | Hittleman et al. .......... 709/203 |
| 2003/0081003 A1 * | 5/2003 | Kutay et al. ................ 345/762 |
| 2004/0015366 A1 * | 1/2004 | Wiseman et al. .............. 705/1 |
| 2006/0236306 A1 * | 10/2006 | DeBruin et al. ............ 717/113 |
| 2009/0144628 A1 * | 6/2009 | Stevens et al. ............. 715/733 |

* cited by examiner

*Primary Examiner*—Douglas B Blair
(74) *Attorney, Agent, or Firm*—Campbell Stephenson LLP (57) ABSTRACT

The present invention provides a system and method that facilitates system integration through standardized messages. In one embodiment, standardized-message processing is enabled through the configuration of internal and external integration objects through a user interface.

5 Claims, 9 Drawing Sheets

SELECT THE INTEGRATION COMPONENTS THAT YOU WOULD LIKE TO ACTIVATE FOR THIS EXTERNAL INTEGRATION OBJECT BY CHECKING THE APPROPRIATE ITEMS

- [x] SPExtensionsInqRq
  - [x] LOBCd
  - [x] SPXAsDt
  - [x] RqUID
  - [x] CustLoginId

400

[x] INCLUDE COMPONENT    [ ] IGNORE COMPONENT

CREATE NEW INTERNAL INTEGRATION OBJECTS

INTERNAL REQUEST INTEGRATION OBJECT

BUSINESS OBJECT

INTEGRATION OBJECT NAME

INTERNAL RESPONSE INTEGRATION OBJECT

☐ USE THE SAME INTEGRATION OBJECT AS REQUEST — 710

BUSINESS OBJECT
FINS Life Policy

INTEGRATION OBJECT NAME — 720
ACORDSamplePolicy

SELECT THE INTEGRATION COMPONENTS THAT YOU WOULD LIKE TO ACTIVATE FOR
THIS INTERNAL INTEGRATION OBJECT BY CHECKING THE APPROPRIATE ITEMS

810

- [x] FINS Life Policy
  - [x] FINS Life Policy_FINS Life Policy Contact
  - [x] FINS Life Policy_FINS Annuity Option
  - [x] FINS Life Policy_Position
  - [x] FINS Life Policy_INS Pay Plan
  - [x] FINS Life Policy_Organization
- [x] Action
  - [x] Action - Simplified Version for Deep Copy
- [x] Contact
- [x] FINCORP Account Balance History
- [x] FINS Annuity Withdraw Surrender
- [x] FINS Annuity Withdraw Surrender.Line Number (Sequence)
- [x] FINS Benef Class

[x] INCLUDE COMPONENT     [ ] IGNORE COMPONENT

SYSTEM INTEGRATION SYSTEM AND METHOD

BACKGROUND OF THE INVENTION

This invention relates generally to system integration, and more particularly to a system and method for enabling users to promote information exchange between systems.

Computers have enabled businesses to automate many manual business processes. As these business processes were typically segmented along departmental lines, the computer systems that automated those business processes were also segmented along departmental lines. The result was an enterprise consisting of a set of narrowly-focused systems that did little more than automate the same steps and procedures that comprised the manual business process. These systems lacked interoperability or any means of integration with other systems. Accordingly, it was difficult to create a single, comprehensive view of customers, their behavior, and their value to the company.

Today's corporate infrastructure typically includes a wide variety of information systems such as enterprise resource planning (ERP) and customer relationship management (CRM) systems that further interact with custom applications, databases, and network technologies. This complex mix of information technology has created significant integration issues. In particular, customers often require a level of integration that enables the exchange of real-time business data among ERP/CRM systems, legacy systems, and/or external business partners. What is needed therefore is a mechanism that promotes integration within a broader enterprise framework.

SUMMARY

The present invention provides a system and method that facilitates system integration through standardized messages. In one embodiment, standardized-message processing is enabled through the configuration of internal and external integration objects through a user interface.

DETAILED DESCRIPTION

An embodiment of the invention is discussed in detail below. While specific implementations of the invention are discussed, it should be understood that this is done for illustration purposes only. A person skilled in the relevant art will recognize that other components and configurations may be used without departing from the spirit and scope of the invention.

Applications are typically called upon to perform mission-critical functions that are used to run the enterprise. These functions represent a large portion of an organization's business. In various examples, the functions can include the ordering of supplies, the scheduling of workflow elements, the fulfillment of customer orders, and the processing of company finances.

As noted, business applications have conventionally worked in isolation in the segmented departments of a company. This processing framework is in stark contrast to the business reality of processes that do not occur in isolation. While manual steps exist to integrate the applications, these steps introduce delay and added cost to the delivery of an end product or service. Companies that deploy solutions that minimize these delays and costs can develop and maintain a long-term competitive advantage through dramatic long-term improvements in sales productivity and customer satisfaction. These benefits provide a substantial positive economic value to the corporation.

In this context, the need for enterprise application integration (EAI) is clear. One of the primary purposes of EAI solutions is to replace manual integration with interprocess coordination. This interprocess coordination speeds up the business process and reduces company overhead.

Further benefits of process integration can also be realized in the interaction with external systems. Here, it should also be noted that a company itself is often a part of a broader business process. For example, in the manufacturing sector a company will often play a role in a single step in the process of transforming a product from raw materials to finished goods. Thus, companies typically operate in the context of a set of business relationships that define a broader supply-chain framework.

Here again, as with a company's internal processing, companies typically interact with external organizations through manual processes. Significant improvements in efficiency can therefore be gained through the automation of traditional manual processes. For example, significant efficiencies can be gained in an ordering process that enables an inventory application in one company to place an order directly with the order entry process of a trusted supplier. EAI in the context of company-to-company interactions can be based on the flow of standardized messages between applications.

In one embodiment extensible markup language (XML) messages (e.g., request/response and update messages) are transmitted between applications. In general, XML is a markup language for documents containing structured information. XML adds tags to data so that it can be processed by an application. These tags describe, in a standardized syntax, what the data is, so that the applications can understand its meaning and how to process the data.

XML documents must be "well formed," which means that most document-type information (e.g., grammar and hierarchy) can be embedded in the tags that mark up the individual document. There can also be an associated document type definition (DTD), containing additional meta-information that describes the data. The purpose of a DTD is to define the legal building blocks of an XML document. It defines the document structure with a list of legal elements. In effect, a DTD enables the creation of a specialized markup language.

The communication of messages in a standardized format enables two systems to efficiently exchange data. Integration in the business processes performed by these two systems therefore results. As part of this process, an adapter module is invoked to translate received messages into formats that are recognizable by the internal operations of the receiving systems. Similarly, a converter module is invoked to translate internal messages into a standardized format for transmission to an external system.

To illustrate an example of a conversion process that can be applied between an internal database system and an external system, an example environment based on a Siebel architecture is described.

In general, the Siebel architecture includes the concept of a business object (BusObject), which is a highly customizable, object-oriented building block. The BusObject implements a business model, tying together a set of interrelated business components (BusComps) using links. The set of relationships established in a BusObject provides the foundation for views, wherein every view has a BusObject assigned to it. The family of BusObjects is extensive and can include Opportunity, Account, Customer, Product, Competitor, Campaign, Service Request, and Product Defect. BusObjects also include the business logic for the BusComp objects.

BusObjects group one or more BusComps into a logical unit of information. For example, an Opportunity BusObject may consist of an Opportunity, Contact, and Product BusComp, wherein the Opportunity BusComp dictates the information of the other BusComps (parent-child relationships). A BusObject Manager can be designed to provide for consistent object behavior and interaction of all BusObjects within the enterprise applications.

A BusComp defines a logical entity that associates columns from one or more tables into a single structure. BusComps therefore provide a layer of wrapping over tables. This design creates a greater level of convenience since all associated columns are together in one bundle. This design also enables developer-friendly naming, and the isolation of the developer role from the system administrator role. A BusComp not only encapsulates data but also enables the developer to define the behavior of the entity.

In this framework, integration objects can also be defined to assist in the creation of standardized messages to be exchanged between systems. Integration objects are similar to BusObjects in that they are made up of components. In general, integration objects are representations of portions of one or more BusObjects.

Having described an example environment, a description of a mechanism that promotes system integration is now provided. As will be described in detail below, this mechanism enables a user to rapidly configure the system to interact with an external system through a given standardized message format.

In the present example, an environment including XML-based messages is assumed. In particular, the example provided below illustrates the system integration configuration based on XML messages defined by the Association for Cooperative Operations Research and Development (ACORD), which is the insurance industry's nonprofit standards developer.

This system integration configuration process begins with a selection of a DTD file (e.g., ACORD DTD file). As noted, the purpose of a DTD is to define the legal building blocks of an XML document. After a particular DTD is selected, external integration objects are defined. While internal integration objects are based on BusObjects, external integration objects are based on an external system schema (e.g., DTD). The external integration objects are used in the conversion to/from XML messages.

In accordance with the present invention, a plurality of external integration objects are created for a given system integration configuration. First, an envelope integration object is defined. The envelope integration object includes those components that are represented in the message header portion of a XML message. For example, the envelope integration object can include components that relate to sending system or receiving system information (e.g., system name, machine name, IP address, etc.). An embodiment of a user interface that can be used to define an envelope integration object is illustrated in FIGS. 1 and 2.

Figure 1:
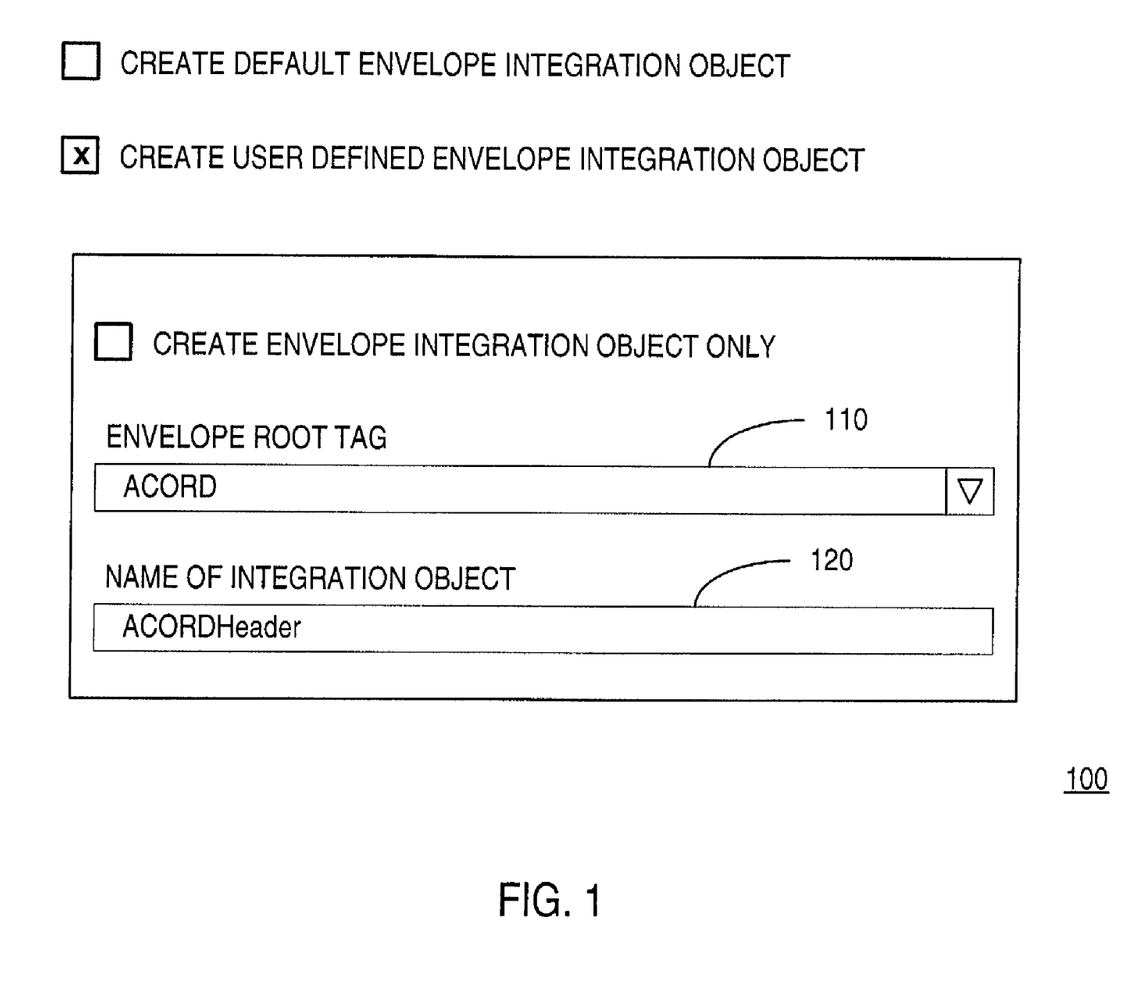
FIGS. 1 and 2 illustrate an embodiment of a user interface screen for defining an envelope integration object.

As illustrated in FIG. 1, the user is first presented with interface screen 100, which enables the user to define an envelope root tag through data entry field 110. This selected envelope root tag is identified by the selected DTD file. As further illustrated by interface screen 100, the user can also define a name for the envelope integration object through data entry field 120.

Figure 2:
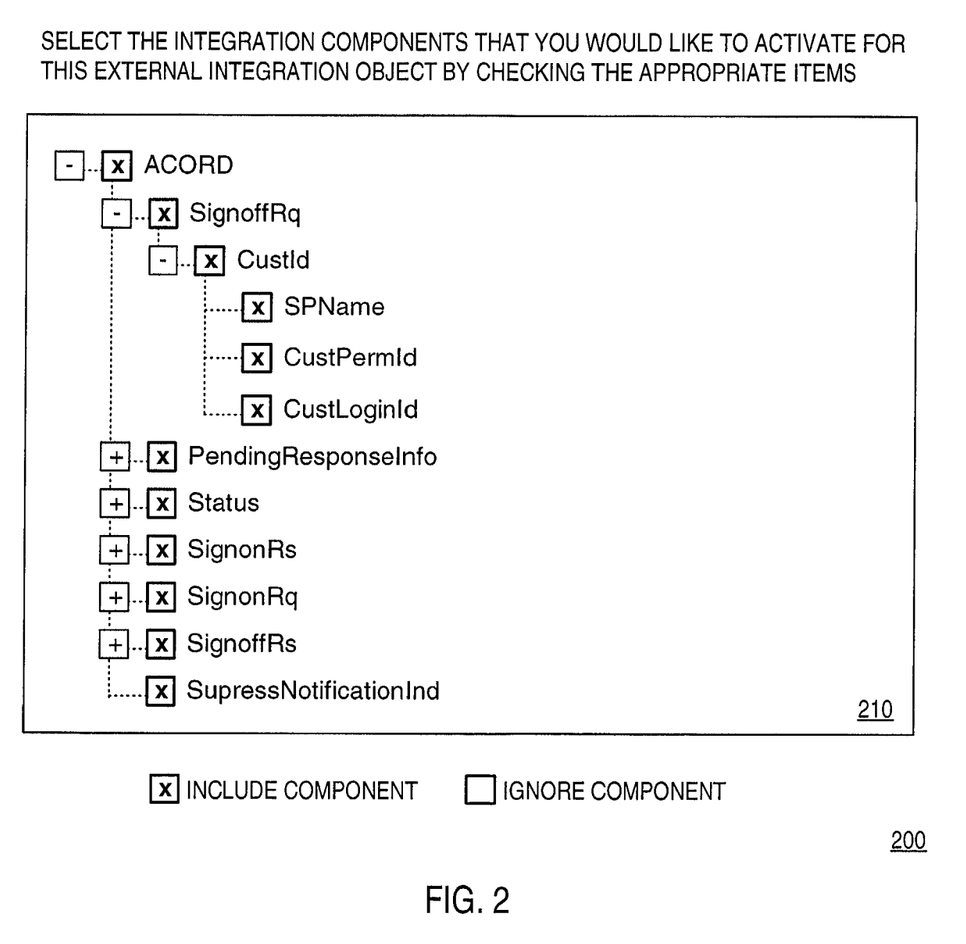

After the user has completed the input requirements of interface screen 100, the user is then presented with interface screen 200 of FIG. 2. Interface screen 200 includes a listing of those components that are defined by the selected ACORD DTD file. These defined components are listed in window 210 as a user-expandable hierarchical listing. As illustrated, the user can choose to expand or contract the component hierarchy to identify the components that the user wishes to include in the envelope integration object. Desired components can be included in the envelope integration object through the selection of the respective check boxes that are associated with the listed components.

In one embodiment, the process of creating the user-expandable component hierarchy begins by parsing the selected DTD file. In this parsing process, the tag (element) information is stored as an array-like data structure. The system can then proceed to build the tree hierarchy by comparing the relationship between elements.

As part of the process of constructing the tree hierarchy, the system can also be configured to detect the existence of any circular element relationships. In particular, the DTD file may define a parent element that refers to a child element that, in turn, refers back to the parent element. This circular parent-child-parent relationship would lead to an infinite processing loop that would hinder the creation of a user-expandable component hierarchy.

If no circular element relationships are detected, then the system will complete the construction of the in-memory hierarchy tree. If the system does detect a circular element relationship, however, the system would then stop the process of building the tree hierarchy. In this scenario, the user would need to select the desired elements manually.

After the components are selected for inclusion in the envelope integration object, the user is then called upon to define the external request integration object and the external response integration object. Unlike the envelope integration object which includes the components relating to the fixed header portion of the message, the external request and response integration objects include the components that relate to the variable transaction portion of the message.

It is a feature of the present invention that separate integration objects are defined for both the header portion and the transaction portion of the message. This feature enables the system to reduce the impact of modifications to the envelope integration object's component hierarchy. As would be appreciated, changes to externally defined message standards are uncontrolled and can occur frequently.

Where envelope integration objects have been separately defined, changes to the envelope integration object's component hierarchy would be confined to the envelope integration object. If a combined integration object is defined for both the header and transaction portions of the message, however, changes to the envelope integration object's component hierarchy would result in changes to all of the integration objects. Thus, the definition of separate integration objects for both the header portion and the transaction portion of the message serves to increase the maintainability and usability of the integration objects within the system.

Figure 3:
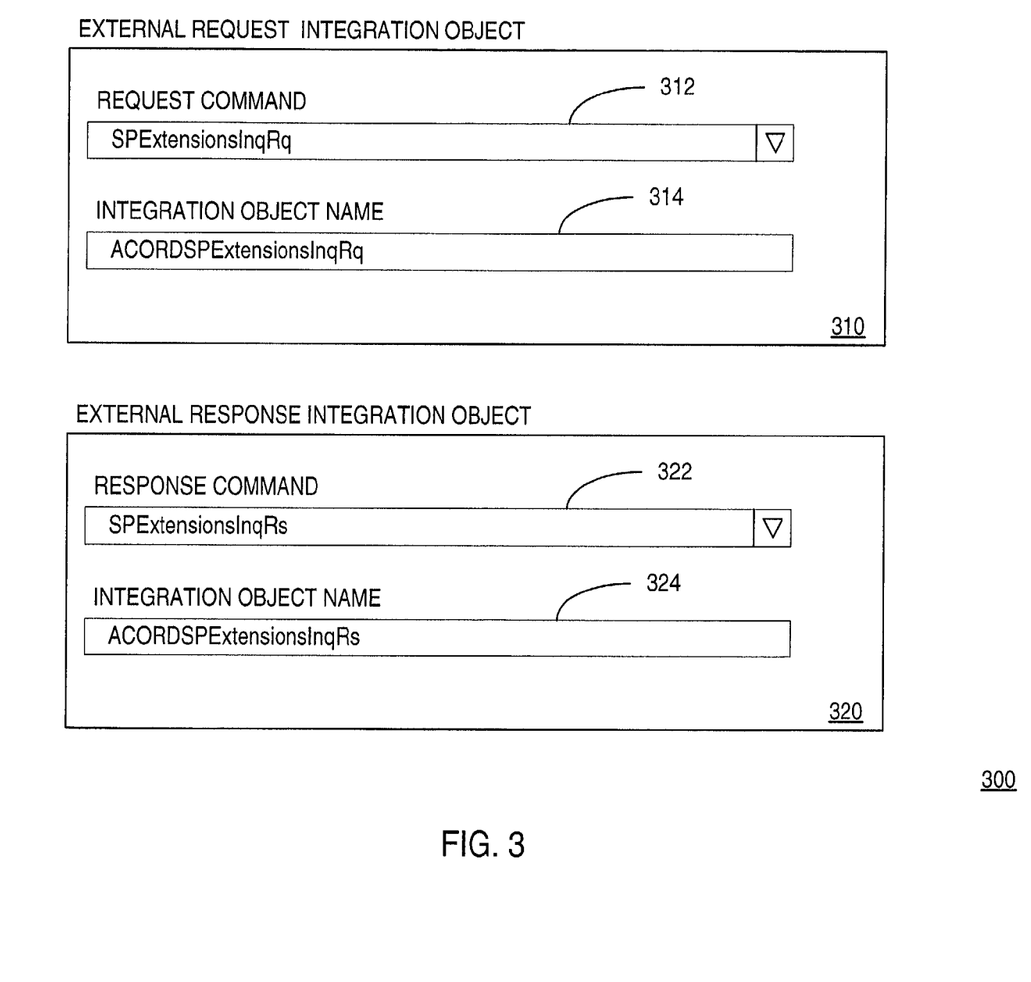
FIGS. 3-5 illustrate an embodiment of a user interface screen for defining an external request integration object and an external response integration object.

The specification of the external request integration object and the external response integration object begins with interface screen 300 of FIG. 3. As illustrated, interface screen 300 includes external request integration object definition area 310 and external response integration object definition area 320. External request integration object definition area 310 further includes request command entry field 312 for specification of the request command, and integration object name entry field 314 for specification of the external request integration object name. Similarly, external response integration object definition area 320 further includes response command entry field 322 for specification of the response command, and integration object name entry field 324 for specification of the external response integration object name. After the external request integration object definition area 310 and external response integration object definition area 320 are completed, the user is then called upon to select the integration components that are to be included in the respective external integration objects.

Figure 4:
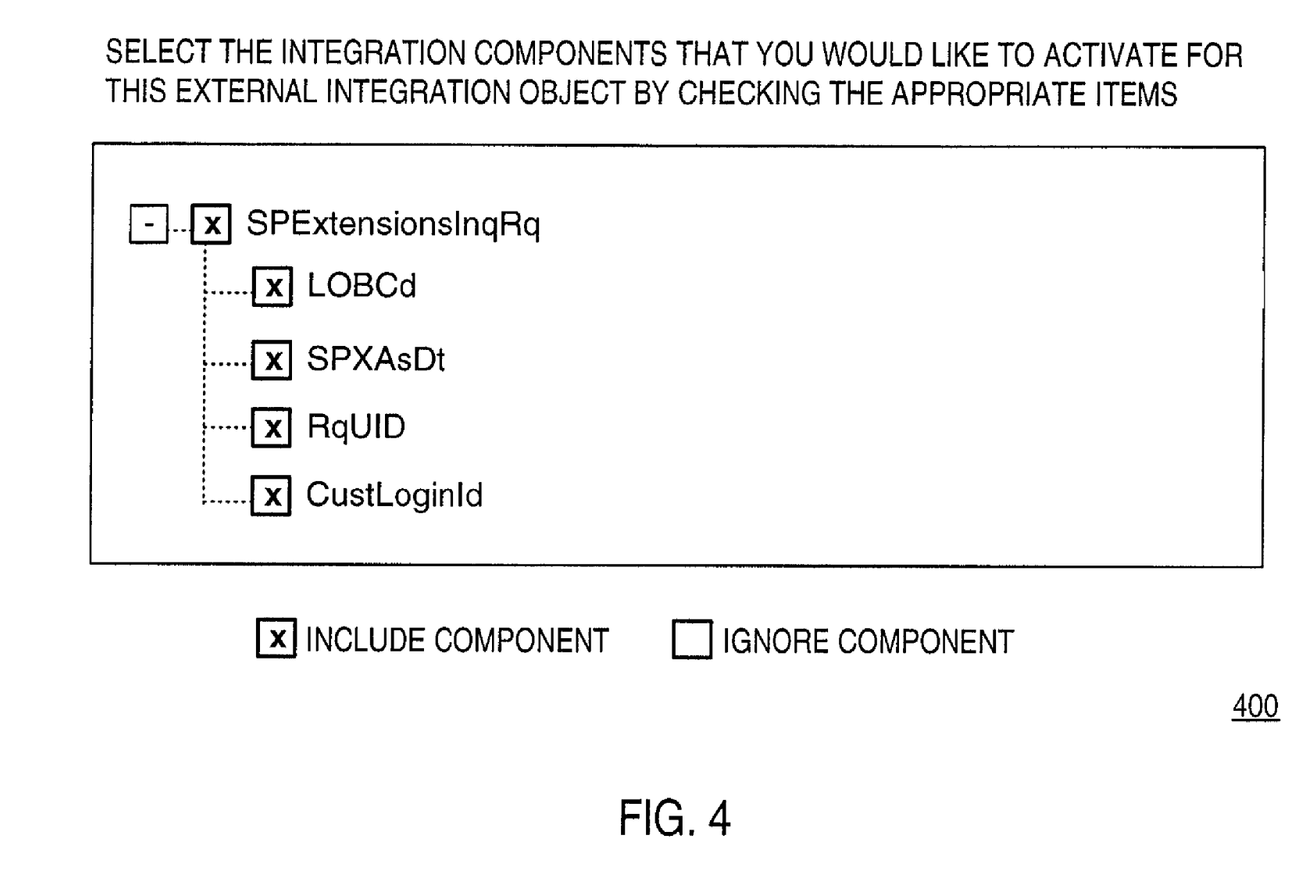

An example interface screen for selecting the desired integration components is illustrated in FIG. 4. As illustrated, interface screen 400 includes a user-expandable hierarchical listing of the components that can be included in the integration object corresponding to the request command (i.e., SPExtensionsInqRq) identified in entry field 312 of interface screen 300.

Figure 5:
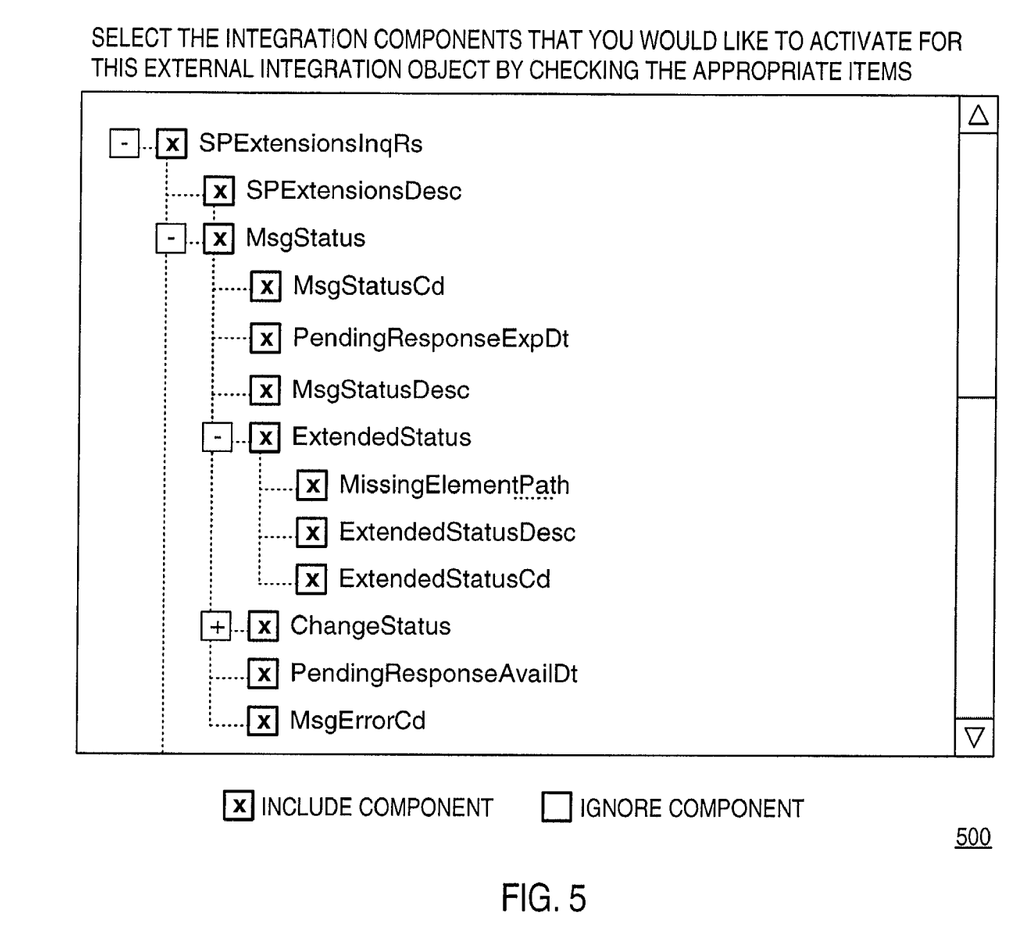

After the desired components are selected for the external request integration object, interface screen 500 of FIG. 5 would then be presented to the user for selection of the components for the integration object corresponding the response command (i.e., SPExtensionsInqRs) identified in entry field 322 of interface screen 300.

After the external integration objects have been defined, the user is then called upon to define the corresponding internal request integration object and the internal response integration object. This process is enabled through the example interface screens of FIGS. 6-8.

Figure 6:
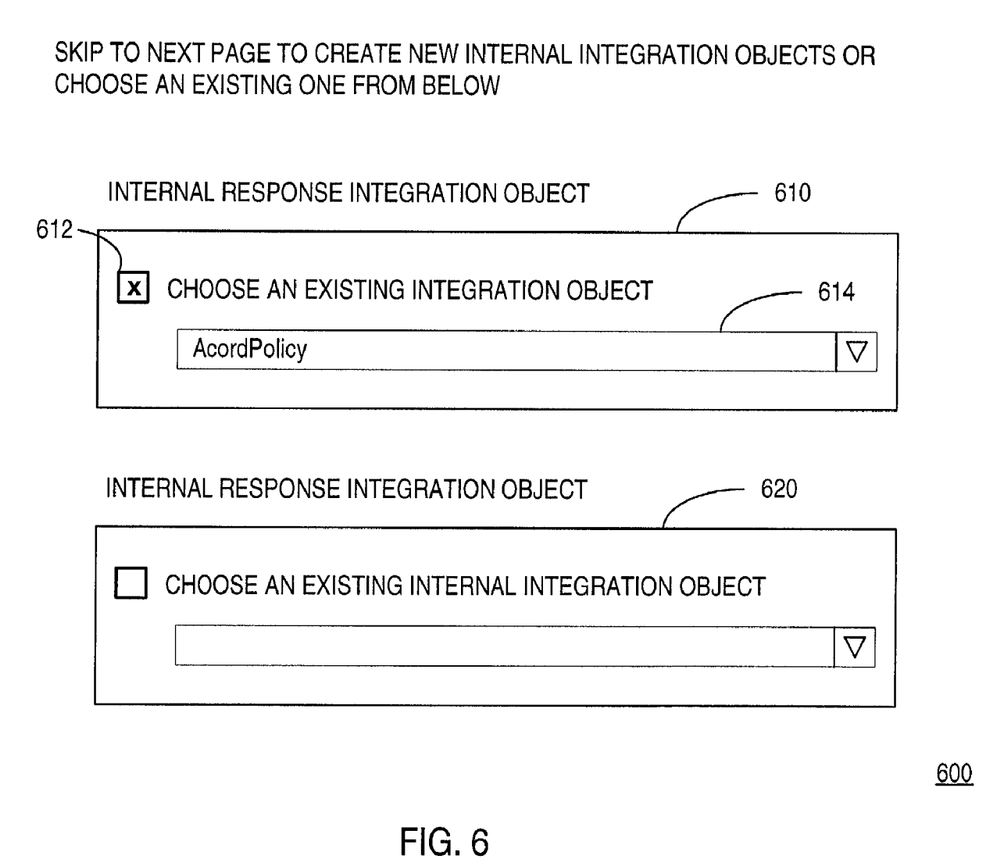
FIGS. 6-8 illustrate an embodiment of a user interface screen for defining an internal request integration object and an internal response integration object.

This process begins with interface screen 600 of FIG. 6. As illustrated, interface screen 600 includes internal request integration object definition area 610 and internal response integration object definition area 620. Both internal request integration object definition area 610 and internal response integration object definition area 620 enable a user to select an existing internal object. For example, the user can identify an existing internal request integration object using data entry area 614. Data entry area 614 is activated after checkbox 612 has been selected by the user.

Figure 7:
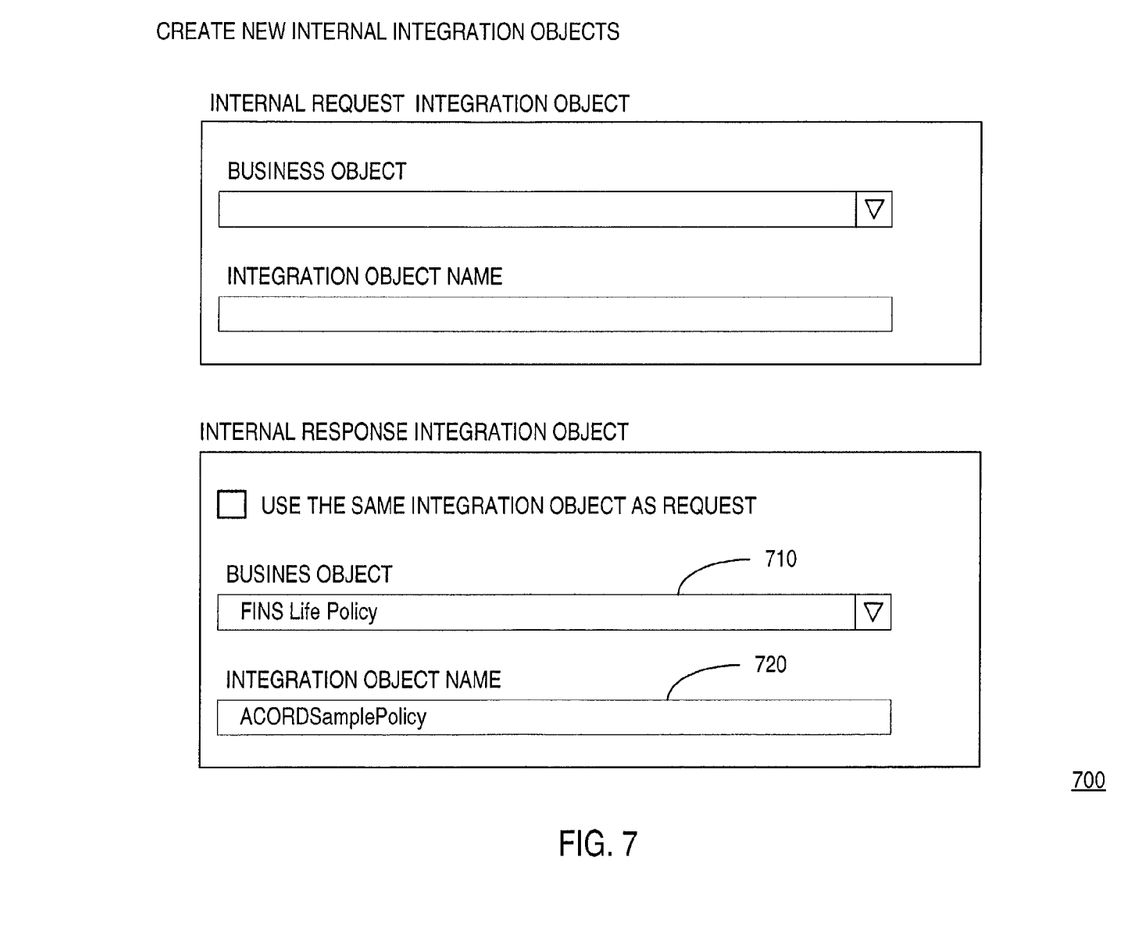

If the user has decided to create a new internal integration object, such as that illustrated in internal response integration object definition area 620, then the user is presented with interface screen 700 of FIG. 7. As illustrated, interface screen 700 enables a user to identify an existing BusObject through data entry field 710, and a corresponding integration object name through data entry field 720.

Figure 8:
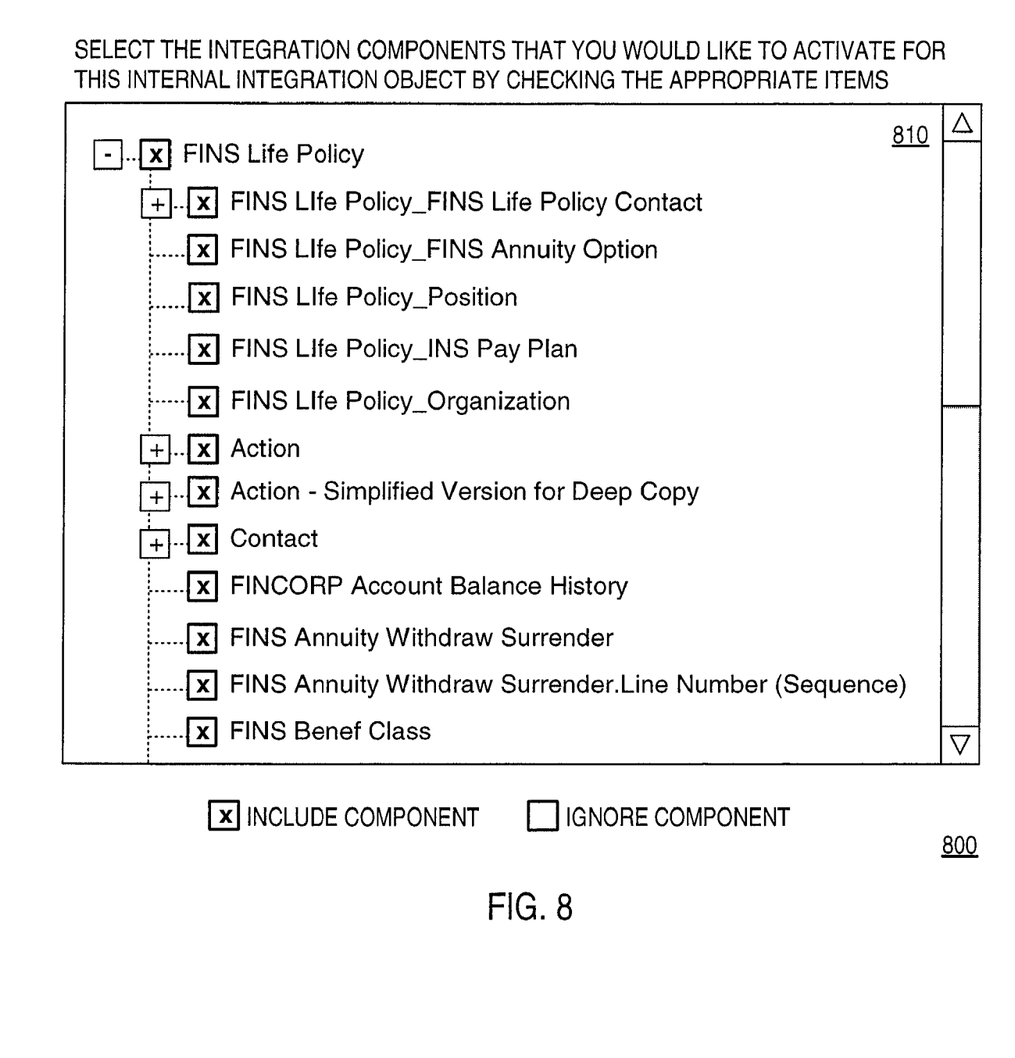

Next, the user is presented with interface screen 800 of FIG. 8. As illustrated, interface screen 800 includes a listing of those components that are included within the BusObject identified in field 710 of interface screen 700. These components are listed in window 210 as a user-expandable hierarchical listing. Here again, the user can choose to expand or contract the component hierarchy to identify the components that the user wishes to include in the internal integration object.

After the user has provided the various data inputs into the interface screens of FIGS. 1-8, the various integration objects are created. In the current example, the inputs of interface screens 100, 200 would enable the system to create the "ACORDHeader" envelope integration object, the inputs of interface screens 300, 400, 500 would enable the system to create the "SPExtensionsInqRq external" request integration object and the "SPExtensionsInqRS" external response integration object, and the inputs of interface screens 600, 700, 800 would enable the system to create the "ACORDSamplePolicy" internal response integration object. As noted in the example of interface screen 600, the user has chosen the existing internal request integration object, "AcordPolicy."

Having created or selected the various integration objects, the system is now able to create standardized messages (e.g., XML messages) to be exchanged between systems. These standardized messages can be converted by the system to/from the standardized messages during runtime.

Figure 9:
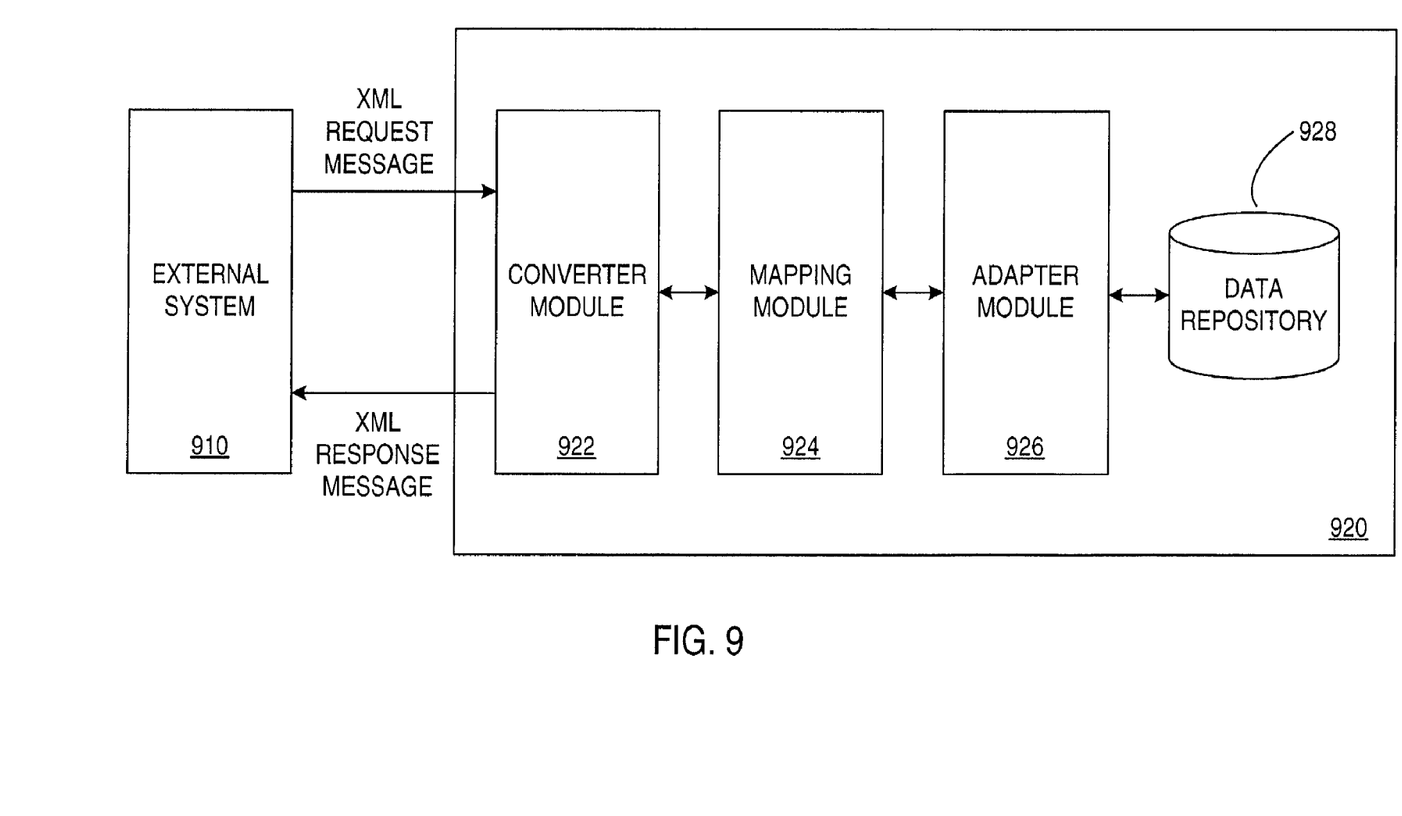
FIG. 9 illustrates an embodiment of a system that enables request/response messaging between systems.

For example, consider a conventional request/response transaction that is processed during runtime by the system of FIG. 9. Here, external system 910 would first define an XML request message, whose structure is defined by a previously parsed DTD file. When an XML request message is received by processing system 910, the data contained within the XML request message is processed by converter module 922. Converter module 922 is generally operative to replace the tag names included within the XML request message with the field names of the components included within the envelope integration object instance and the external request integration object instance. The envelope integration object instance and the external request integration object instance are identified by the tags (e.g., "ACORD" and "SPExtensionsInqRq") in the header of the XML request message.

The component fields of the envelope integration object instance and the external request integration object instance are then mapped by mapping module 924 to the component fields of the internal request integration object instance. As would be appreciated, the mapping between component fields of an external integration object instance and the component fields of an internal integration object instance can be accomplished through a predefined map. In one embodiment, the map name for the incoming/outgoing message is provided as an input argument to mapping module 924 along with other input arguments, including the external request integration object instance name, the external response integration object instance name, the internal request integration object instance name, and the internal response integration object instance name. As would be appreciated, the input arguments to the mapping module can also be designed to include the XML path language (XPath) value, which includes a path expression to identify nodes in an XML document.

After the component fields have been mapped between the respective integration object instances, the data is passed to adapter module 926. Adapter module 926 is generally operative to exchange data between the internal request integration object instance and the associated BusObject(s) instance(s) and interact with an object manager to insert the received data into data repository 928.

In the outgoing direction intended to produce the XML response message, the reverse of the process described above is used. Here, adapter module 926 would first retrieve data from data repository 928 and exchange the data between the BusObject(s) instance(s) and the internal response integration object instance. Mapping module 924 would then convert the component fields of the internal response integration object instance to the component fields of the envelope integration object instance and the external response integration object instance. Finally, converter module 922 would operate to replace the field names of the components of the envelope integration object instance and the external response integration object instance with the tag names for the XML response message. The generated XML response message would then be transmitted to external system 910. As would be appreciated, the process of generating outgoing XML messages can be based on XML template that can be populated with data.

As thus described, external and internal integration objects can be used to facilitate the integration of systems through standardized messaging. Through the example user interface described above with reference to FIGS. 1-8, a user can quickly customize the external and internal integration objects through the user selection of included components. This level of automation in the integration process obviates the need for hard-coded scripts to coordinate the information exchange between standardized messages and the internal database system.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for processing of message data from messages sent between a first application recognizing messages of a first format and a second application recognizing messages of a second format but not the first format, the method comprising:

selecting a document type definition (DTD) file using a first graphical user interface (GUI), wherein the DTD file comprises components relating to XML message tags;

creating a first integration object using a second GUI, wherein
said first integration object comprises a first set of components selected from the components of the DTD file,
said first set of components relate to tags that are contained in a message header of a standardized XML request, creating a second integration object using a third GUI, wherein said second integration object comprises a second set of components selected from the components of the DTD file,
said second set of components relate to tags that are contained in a transactional portion of the standardized XML request, creating a third integration object using a fourth GUI, wherein said third integration object comprises a third set of components selected from the components of the DTD file,
said third set of components relate to tags that are contained in a transactional portion of a standardized XML response message;

a computer system receiving an XML message from the second application;

the computer system replacing first tags in the received XML message with the first components, respectively, of the first integration object;

the computer system replacing second tags in the received XML message with second components, respectively, of the second integration object;

modifying one or more of the first components of the first integration object without modifying the second and third integration objects;

the computer system receiving a second XML message from the second application;

the computer system replacing first tags in the received second XML message with first components, respectively, of the modified first integration object;

the computer system replacing second tags in the received second XML message with second components, respectively, of the second integration object.

2. The method of claim 1:

the computer system exchanging data of the XML message with a business object (BusObject) that is associated with the second integration object;

wherein the BusObject is exclusive to said first application; and the computer system mapping said at least one component included in said first integration object and at least one component included in said second integration object to component fields in said BusObject exclusive to said first application, wherein
said BusObject exclusive to said first application performs data processing, wherein said data processing comprises processing of data in the received XML message, and
the BusObject exclusive to the first application is otherwise unable to recognize the format of the received XML message.

3. The method of claim 1, wherein said first integration object is an envelope integration object.

4. The method of claim 1, wherein said second integration object is an external request integration object and said third integration object is an external response integration object.

5. The method of claim 1, wherein said second integration object is an external response integration object and said third integration object is an external response integration object.

* * * * *

UNITED STATES PATENT AND TRADEMARK OFFICE
CERTIFICATE OF CORRECTION

| | | |
|---|---|---|
| PATENT NO. | : 7,685,314 B2 | |
| APPLICATION NO. | : 10/183020 | |
| DATED | : March 23, 2010 | |
| INVENTOR(S) | : Chiun-Feng Hsiao et al. | |

It is certified that error appears in the above-identified patent and that said Letters Patent is hereby corrected as shown below:

In Sheet 7 of 9, FIG. 7, line 7, delete "BUSINES" and insert -- BUSINESS --, therefor.

Signed and Sealed this
First Day of March, 2011

David J. Kappos
*Director of the United States Patent and Trademark Office*